United States Patent

[11] 3,610,756

[72] Inventors Godehard Lenzen
2 Hamburg 67 Frankring 31e, Hamburg-Volksdorf;
Manfred Eickhorst, Feldstr. 135/8-15, 2 Wedel/Holstein, both of Germany
[21] Appl. No. 20,618
[22] Filed Mar. 18, 1970
[45] Patented Oct. 5, 1971

[54] APPARATUS FOR DETERMINING THE COLOR OF CUT DIAMONDS
12 Claims, 2 Drawing Figs.
[52] U.S. Cl. .................................................. 356/30, 250/227, 356/201
[51] Int. Cl. ............................................... G01n 21/00
[50] Field of Search ............................................ 356/30, 120, 201, 209; 350/96 R; 250/227

[56] References Cited
UNITED STATES PATENTS
574,588 1/1887 Thorp ........................ 356/30
2,157,437 5/1939 Shipley et al. ................... 350/89
2,533,747 12/1950 Thienemann .................. 350/239
2,909,961 10/1959 Samuels ........................ 356/30

Primary Examiner—Ronald L. Wibert
Assistant Examiner—Edward S. Bauer
Attorney—Richards & Geier ABSTRACT: The apparatus includes a well-known holder receiving a cut diamond for determining its color. The diamond is held by the holder below its holder or mounting edge leaving its upper portion with the planar surface and the facets fully exposed. A source of monochromatic light is provided above the holder adjustable with respect to the distance between the upper planar surface of the diamond and the source of light. A photoelectric receiver is arranged above the diamond receiving and measuring the ray entered through the upper planar surface and emerging from the facets of the diamond.

3,610,756

APPARATUS FOR DETERMINING THE COLOR OF CUT DIAMONDS

BACKGROUND OF THE INVENTION

Hitherto it was common practice to either determine the color by visual inspection, or with the aid of the so-called "Ulbricht"-sphere which, however, is a very expensive device. While the visual determination presupposes precise knowledges of reference pieces, long training, and great experience, whereby it still remains dependent on subjective influences, the determination method with the aid of the "Ulbricht"-sphere is incorrect, in so far as the surface reflections of the light rays entering the diamond are included in the consideration, i.e. they are included the measured value.

It is a fact, well known to those skilled in the art, that the color of a diamond depends on structural inhomogeneities, i.e. that the light entering the diamond and being reflected therein is subjected to an absorption which is the cause of the color. However, if this absorption is to be measured, and the components of the surface reflection are not excluded, this will always lead to incorrect measurement results.

SUMMARY OF THE INVENTION

Therefore, the main object of this invention is to provide an apparatus for measuring exclusively the color, photometrically referred to as absorption, caused by the path of rays within the diamond in accordance with the type of cut, wherein the technical expenditure is to be kept low, wherein the possibility of adjustment is as simple as possible.

Further objects of the invention include:

1. To provide an apparatus as aforesaid, wherein a source of monochromatic light is provided above the holder which is adjustable in distance relative to the upper flat surface of the diamond, while at least one photoelectric receiver is arranged above the diamond, preferably around the source of light.
2. To provide an apparatus as aforesaid, wherein a light conducting element is used as source of light, which may suitably consist of a fibrous optic, preferably a flexible fibrous optic, or of a fibrous optical cross-sectional transducer, or of a light conducting rod, preferably surrounded by an encasement.
3. To provide an apparatus as aforesaid, wherein a photoelectric receiver is used which may optionally be a photoresistance, or a photomultiplier, or a secondary electron multiplier.
4. To provide an apparatus as aforesaid, wherein said photoelectric receiver includes a through aperture snugly surrounding said light conducting element.
5. To provide an apparatus as aforesaid, wherein a fine adjustment for the distance between said source of light and said upper planar surface of the diamond is provided.
6. To provide an apparatus as aforesaid, characterized by the provision of an optical mirror for the emerging ray arranged upwardly with respect to said upper planar surface of the diamond and mounted by means allowing adjustment of its angular inclination, wherein said photoelectric receiver is disposed laterally of said mirror in a direction of the ray reflected by said mirror Followingly the invention shall be described in connection with the attached diagrammatic drawings showing exemplified embodiments of the invention.

DESCRIPTION OF THE PREFERRED EMBODIMENT

Figure 1:
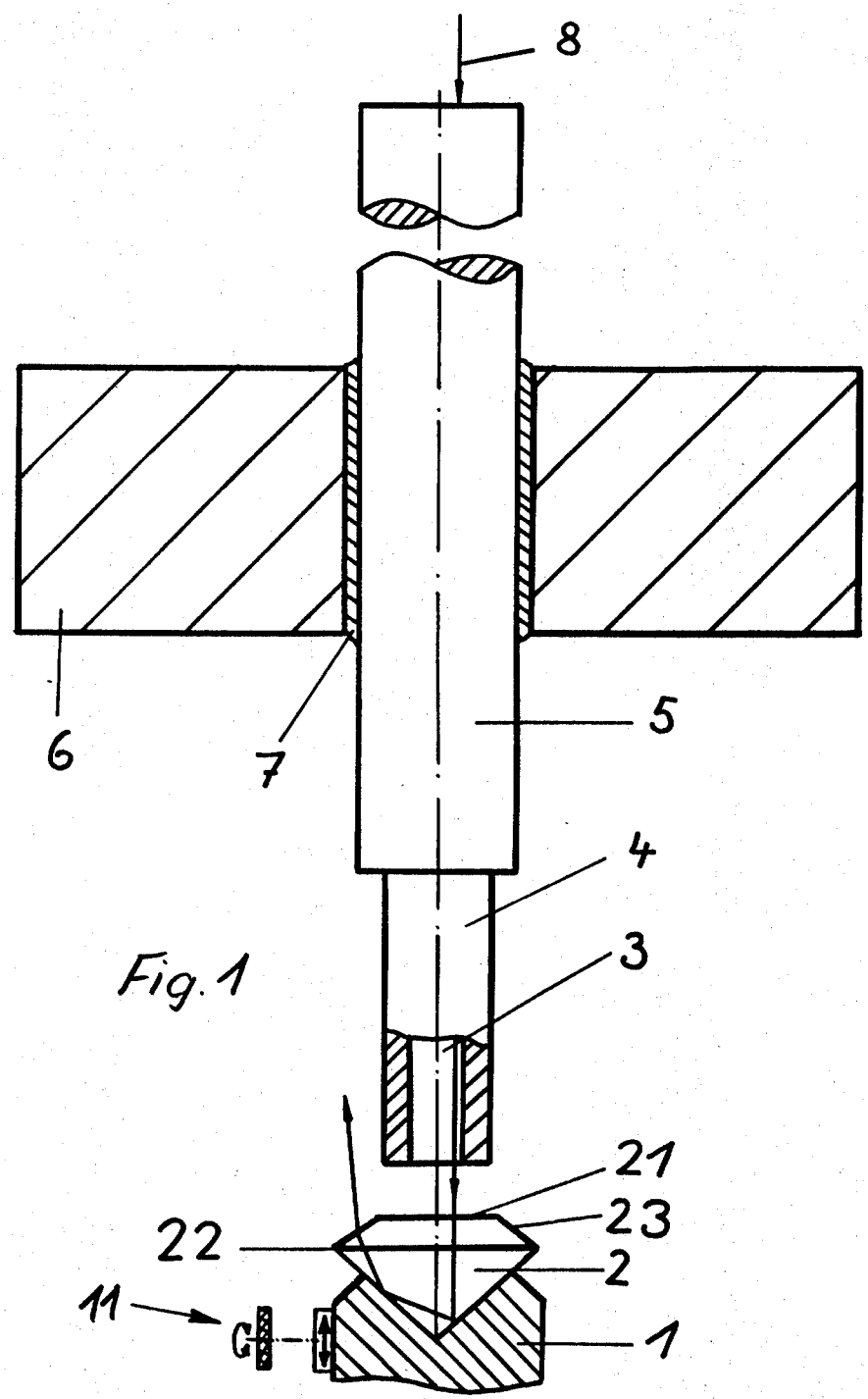
FIG. 1 is a diagrammatic view of the apparatus according to the invention partly shown in section.

Referring now to FIG. 1, the apparatus according to the invention comprises a holder 1, well known in the art, adapted to receive a brilliantly cut diamond 2 including a planar upper surface 21, a circumferential edge 22, facets 23 of the upper portion, and a lower portion, wherein the circumferential edge 22 is disposed upwardly of the holder, thus assuring that the upper portion 21, 22, 23 is fully exposed. The holder 1 includes a cut zone corresponding the configuration of the cut of the lower portion, thus allowing to place the diamond 2 therein without any difficulties, and to use the holder for large as well as small diamonds since, as is well known, the center angles of the lower portions are alike for all diamonds. Upwardly of both the holder 1 and the diamond 2, but suitably coaxially aligned therewith a source of light 3 is provided which, in this case, is in form of a light conducting rod including an encasement 4, wherein the cross-sectional area of this light conductor must not be larger than the area of the planar upper surface 21 of the diamond, so that the emerging ray is not influenced, and avoiding that light might even enter the facets 23 at the upper portion. The light conductor is mounted on a support 5 around which a photoelectric receiver 6 is arranged provided with a through aperture serving to cement it to the support 5, so that all of the light reflected by the diamond must incide the receiver 6. Due to the geometric conditions of the brilliantly cut diamond 2, i.e. the unitary cut under consideration of the standardized magnitudes of the angles due to the constants of material (index of refraction, dispersion), an entering ray 8 of monochromatic light 8 exits through the facets 23 at the upper portion of the diamond 2 and the photoelectric receiver 6 measures the intensity of the emerging ray at each particular wavelength, while prior to this the intensity of the entering ray had been determined already. In this manner there are no difficulties in determining the intensity difference between the emerging and the entering ray, and this difference represents the absorption. The relationships between the lights source 3 and the diamond 2 can be adjusted by control means 11.

Figure 2:
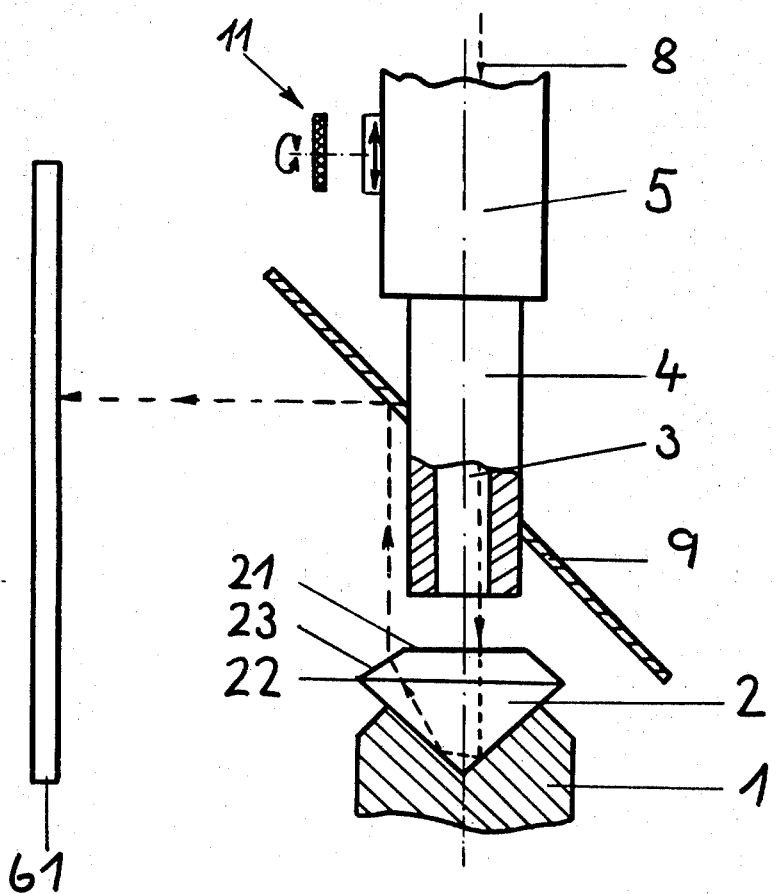
FIG. 2 is a diagrammatic view of another modified embodiment, also partly shown in section.

In the modified embodiment shown in FIG. 2 there is an optical mirror 9 arranged upwardly of the upper planar surface 21 of the diamond 2, preferably under an angle of 45°, reflecting the ray emerging from the facets 23 of the upper portion to a laterally disposed photoelectric receiver 61. In this embodiment the mirror 9 includes an aperture through which the light element 3 extends.

The holder has a conical opening with an opening angle corresponding to the apex angle of the lower portion of the diamond 2, whereby diamonds of different sizes may be inserted successively without any difficulties. Practically a single adjustment of the holder will suffice to provide suitable conditions with respect to the position of the upper planar surface 21 of the diamond 2 relative to the light conducting element 3.

It will be understood that for diamonds with other forms of cut, differing from the brilliant cut, holders adapted to such special forms of cut may be used. With an apparatus as described before and illustrated in the drawings which is relatively simple in manufacture and therefore low in costs, and which, in addition, is an easy operable and transportable device, it is possible to allow a ray of light to enter the diamond without developing surface reflections, and thus diffusion effects caused thereby, representing a loss of light intensity preventing an exact measurement of the absorption within the diamond. Thus the possibility of repetition of the once made measurement is assured, which may be made at another time and location, and by different persons. In addition, due to the arrangement of the photoelectric receiver around the source of light, little space is required and complex mirror arrangements for deviating the reflected rays are avoided. Due to the fact that the photoelectric receiver is arranged around the source of light it is assured that all of the rays, totally reflected within the diamond, and exiting out of the beveled edges at the upper part, are actually inciding the photoelectric receiver and may be measured thereby, while eventual surface reflections might exit laterally which would not incide the receiver.

What is claimed:

1. An apparatus for determining the color of cut diamonds of any type of cut including a holder for the diamond holding it below its mounting edge while its upper portion remains entirely exposed, characterized in that a source of monochromatic light is provided above said holder which is adjustable in distance relative to the upper planar surface of the diamond while at least one photoelectric receiver is arranged above said diamond, said apparatus including means for directing said monochromatic light to be incident on only said upper planar surface of said diamond so that rays of said light are reflected by the lower surfaces of the diamond and emerge from the upper facets of the diamond toward said photoelectric receiver which provides an indication of the color of the diamond as a function of the amount of light absorbed by the diamond.

2. An apparatus according to claim 1, wherein a light conducting element is used as said source of light.

3. An apparatus according to claim 2, wherein said light conducting element consists of a fibrous optic.

4. An apparatus according to claim 3, wherein said fibrous optic is flexible.

5. An apparatus according to claim 2, wherein said light conducting element consists of a light conducting rod.

6. An apparatus according to claim 5, wherein said light conducting rod is arranged within an encasement.

7. An apparatus according to claim 2, wherein said photoelectric receiver has an aperture therethrough and snugly surrounds said light conducting element.

8. An apparatus according to claim 1, wherein a photoresistance is used as said photoelectric receiver.

9. An apparatus according to claim 1, wherein a photomultiplier is used as said photoelectric receiver.

10. An apparatus according to claim 9, wherein a secondary electron multiplier is used as said photomultiplier.

11. An apparatus according to claim 1, wherein a fine adjustment for the distance between said source of light and said upper planar surface of the diamond is provided.

12. An apparatus according to claim 1, characterized by the provision of an optical mirror for the emerging rays arranged upwardly with respect to said planar surface of the diamond and mounted by means allowing adjustment of its angular inclination, wherein said photoelectric receiver is disposed laterally of said mirror in a direction of the rays reflected by said mirror.